US006544115B1

(12) United States Patent
Graf

(10) Patent No.: US 6,544,115 B1
(45) Date of Patent: Apr. 8, 2003

(54) FAIRING VENT AND METHOD OF INSTALLATION

(76) Inventor: Raymond P. Graf, 821 Palm Grove Ct., South Daytona, FL (US) 32119

( * ) Notice: Subject to any disclaimer, the term of this patent is extended or adjusted under 35 U.S.C. 154(b) by 61 days.

(21) Appl. No.: 09/931,539

(22) Filed: Aug. 17, 2001

(51) Int. Cl.$^7$ ................................................ B60H 1/00
(52) U.S. Cl. .................................... 454/143; 296/78.1
(58) Field of Search ............................... 454/143, 270, 454/275; 296/78.1

(56) References Cited

U.S. PATENT DOCUMENTS

| | | | | |
|---|---|---|---|---|
| 4,130,315 A | * | 12/1978 | Shields | 296/78.1 |
| 4,457,552 A | | 7/1984 | Katsuoka | |
| D275,276 S | | 8/1984 | Rudd et al. | |
| 4,479,676 A | | 10/1984 | Hayes | |
| 4,498,700 A | | 2/1985 | Fujii et al. | |
| 4,564,081 A | * | 1/1986 | Hamane et al. | 180/229 |
| 4,703,825 A | | 11/1987 | Mikami et al. | |
| 4,709,774 A | * | 12/1987 | Saito et al. | 180/229 |
| 4,911,494 A | * | 3/1990 | Imai et al. | 296/78.1 |
| 4,925,231 A | | 5/1990 | Hamguchi | |
| 5,105,731 A | * | 4/1992 | Kraus | 454/143 |
| 5,209,434 A | | 5/1993 | Lo Presti et al. | |
| 5,349,799 A | * | 9/1994 | Schiedegger et al. | 52/473 |
| 5,904,618 A | * | 5/1999 | Lewis | 454/162 |
| 6,059,653 A | * | 5/2000 | Gehring et al. | 454/155 |
| 6,210,266 B1 | * | 4/2001 | Barton | 454/162 |
| 6,302,784 B1 | * | 10/2001 | Berger | 454/289 |

* cited by examiner

Primary Examiner—Derek Boles
(74) Attorney, Agent, or Firm—Paul S. Rooy, P.A.

(57) ABSTRACT

A fairing vent comprising a louver rotatably attached to a body, and a louver handle attached to the louver, and a method of installing the fairing vent on a vehicle fairing. The body contains a duct having a duct intake and a duct outlet. The louver is sized to block airflow through the duct when the fairing vent is in the closed position. The fairing vent is closed by rotating the louver using the louver handle until the louver blocks airflow through the duct. A lip is disposed around the duct intake. At least one resilient tab is disposed on the body, each resilient tab being biased away from the body at an angle of approximately 10 degrees. Each resilient tab is disposed a sufficient distance from the lip so as to sandwich the thickness of a vehicle fairing between the lip and the resilient tab(s). The fairing vent is installed on the fairing by cutting a fairing cutout into the fairing. The fairing cutout is sized to admit the body but not the lip. The body is then pushed into the fairing cutout, forcing the resilient tab(s) against, or flush with, the body against each resilient tab(s) installed bias away from the body, until the lip buts up against the fairing. At this point the resilient tab(s) spring back into their installed biased position away from the body, thus trapping the fairing between the resilient tab(s) and the lip, thus immobilizing the fairing vent relative to the fairing.

16 Claims, 4 Drawing Sheets

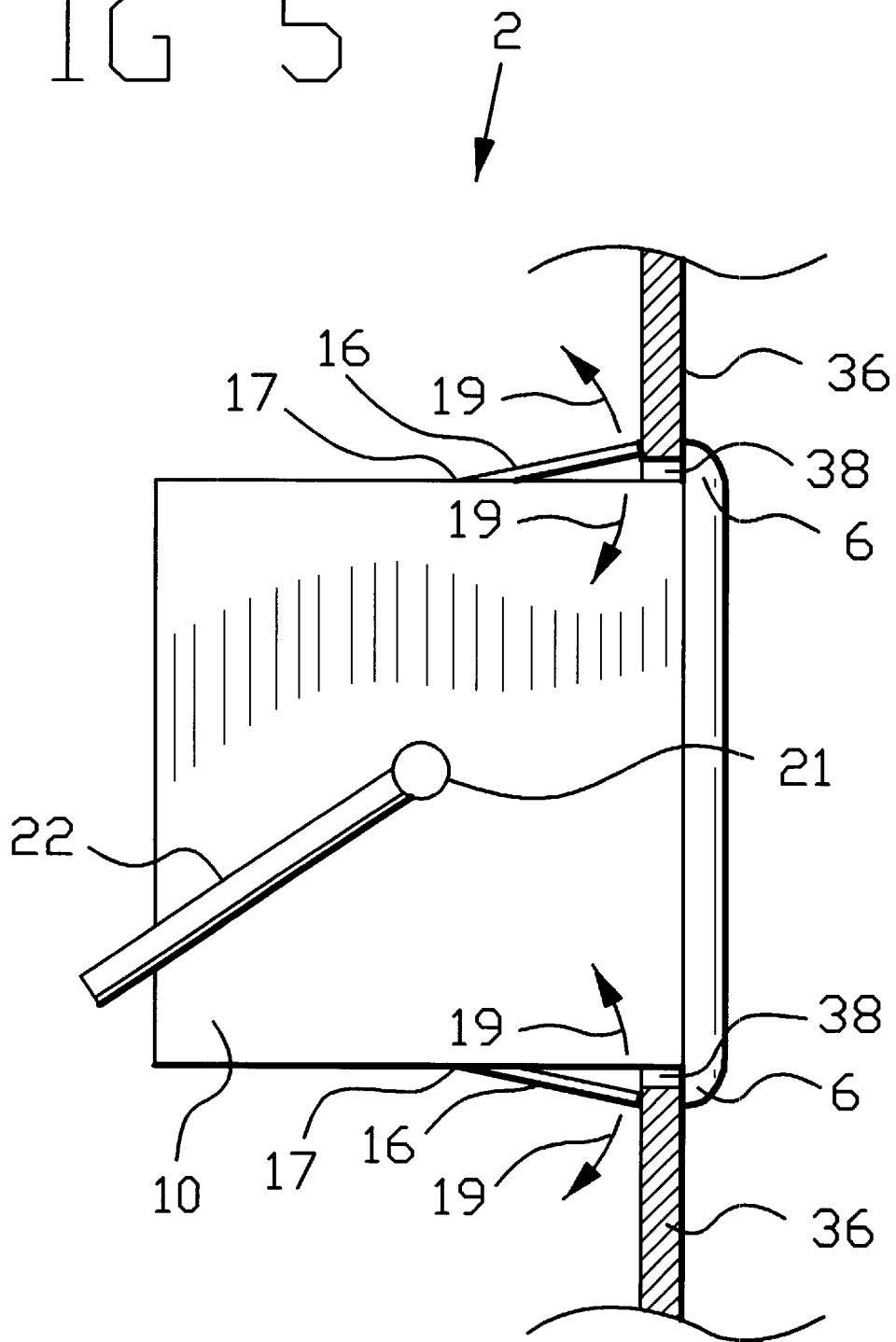

FAIRING VENT AND METHOD OF INSTALLATION

BACKGROUND OF THE INVENTION

1. Field of the Invention

This invention relates to vehicle fairings, and in particular to a fairing vent and method of installation.

2. Background of the Invention

Open cockpit land vehicles such as motorcycles, motor scooters and mopeds are frequently equipped with fairings to protect the occupants from windblast and the associated forced convection cooling effects. During the winter time, and during cool days, this is a comfort to the vehicle occupants. During the summertime, and during hot days in particular, these faired vehicles can become very hot, and some sort of fairing vent is called for to help keep the vehicle occupants cool.

Many vehicles such as motorcycles are not factory-equipped with fairing cooling vents. Thus, it would be desirable to provide a retrofittable fairing vent which could be quickly and easily installed on existing fairings, in order to provide cooling air to the vehicle occupants.

Existing Designs

A number of designs have been proposed to permit fairing ventilation. U.S. Pat. Nos. 4,925,231 and 4,457,552 were granted Hamaguchi and Katsuoka respectively for vents which conducted heated air from around the engine to the operator's foot. Katsuoka '552 was specifically designed to heat motorcycle cockpits. Hamaguchi '231 drew air heated by the cylinders into the cockpit, under the rationale that diluted cylinder heated air was better than hot cylinder air with no cooling air whatsoever. Because neither of these patents taught the delivery of unadulterated ventilating air to the vehicle cockpit, the cooling effect disclosed was not optimum.

Mikami et al. was granted U.S. Pat. No. 4,703,825 for a fairing ventilation system incorporating a fan driven by an electric motor. This design suffered from the complexity and cost associated with an installation requiring wiring, power supply, and switching.

Hayes and Fujii et al. were granted U.S. Pat. Nos. 4,479,676 and 4,498,700 respectively. While these patents taught fairing cooling vents, their installation required specific fairing shapes which had to be built into the fairings from the start. Thus, although these inventions disclosed fairing cooling systems, the cost and complexity of completing a retro-fit installation would be prohibitive.

Shields was granted U.S. Pat. No. 4,130,315 for a motorcycle fairing vent means. While this invention appeared to teach a fairing vent, installation was complex, requiring drilling a minimum of two holes per vent for screws to hold support blocks. Thus, while the Shields vent appeared to be retrofittable into existing motorcycle fairings, no quick and easy attachment means was provided to mount the vent to the fairing.

SUMMARY OF THE INVENTION

Accordingly, it is an object of the present invention to provide a fairing vent which is quick and easy to install. Design features allowing this object to be accomplished include a vent body having at least one resilient tab biased away from the vent body, whereby the vent body can be inserted through a fairing cutout, and the at least one resilient tab maintains the fairing vent in position within the fairing cutout. Advantages associated with the accomplishment of this object include fast installation, and the attendant cost savings.

It is another object of the present invention to provide a fairing vent which can be opened or closed. Design features allowing this object to be accomplished include a louver rotatably attached to a body within a duct. A benefit associated with the accomplishment of this object is enhanced vehicle occupant comfort.

It is still another object of this invention to provide a fairing vent which provides ventilation air uncontaminated by engine heat. Design features enabling the accomplishment of this object include a fairing cutout in a location where engine heat will not enter a fairing vent disposed in the fairing vent. Advantages associated with the realization of this object include better cooling, and consequent enhanced vehicle occupant comfort.

It is another object of the present invention to provide a fairing vent which is simple. Design features allowing this object to be accomplished include a louver rotatably attached to a body, and at least one resilient tab. Benefits associated with the accomplishment of this object include decreased failure rate, and simple maintenance and repair.

It is yet another object of this invention to provide a fairing vent which is inexpensive and simple to construct. Design features allowing this object to be achieved include the use of components made of readily available, inexpensive materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIGS. 3 and 4. Sheet four contains FIG. 5.

FIG. 5 is a top view of a fairing vent installed in a vehicle fairing.

DETAILED DESCRIPTION OF THE PREFERRED EMBODIMENT

Figure 1:
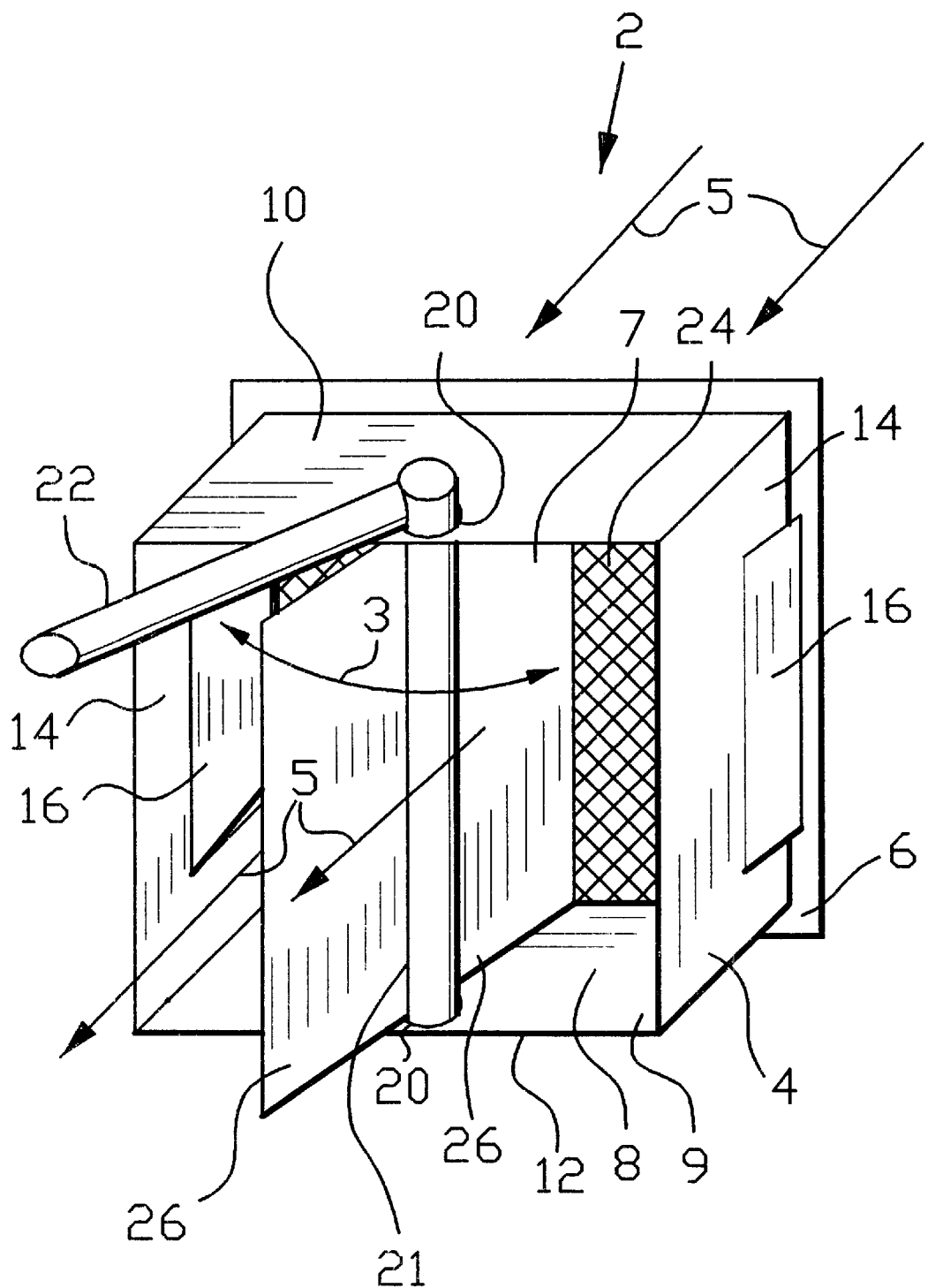
FIG. 1 is a rear quarter isometric view of a fairing vent in the open position.

Referring now to FIG. 1 we observe a rear quarter isometric view of fairing vent 2 in the open position. When installed in a vehicle fairing, cooling air travels through screen 24 and past louver 18 in duct 8 into the cockpit of the vehicle as indicated by arrows 5, thus cooling the vehicle occupants. If the flow of cooling air is to be interrupted, louver handle 22 is moved so as to rotate lover 18 relative to body 4 as indicated by arrow 28 in FIG. 2, until louver 18 completely blocks duct 8, thus cutting off any airflow through fairing vent 2. In this fashion, cooling air can be admitted through the vehicle fairing when fairing vent 2 is in the open position depicted in FIG. 1, and cooling air can be turned off when fairing vent is in the closed position depicted in FIG. 2.

Figure 2:
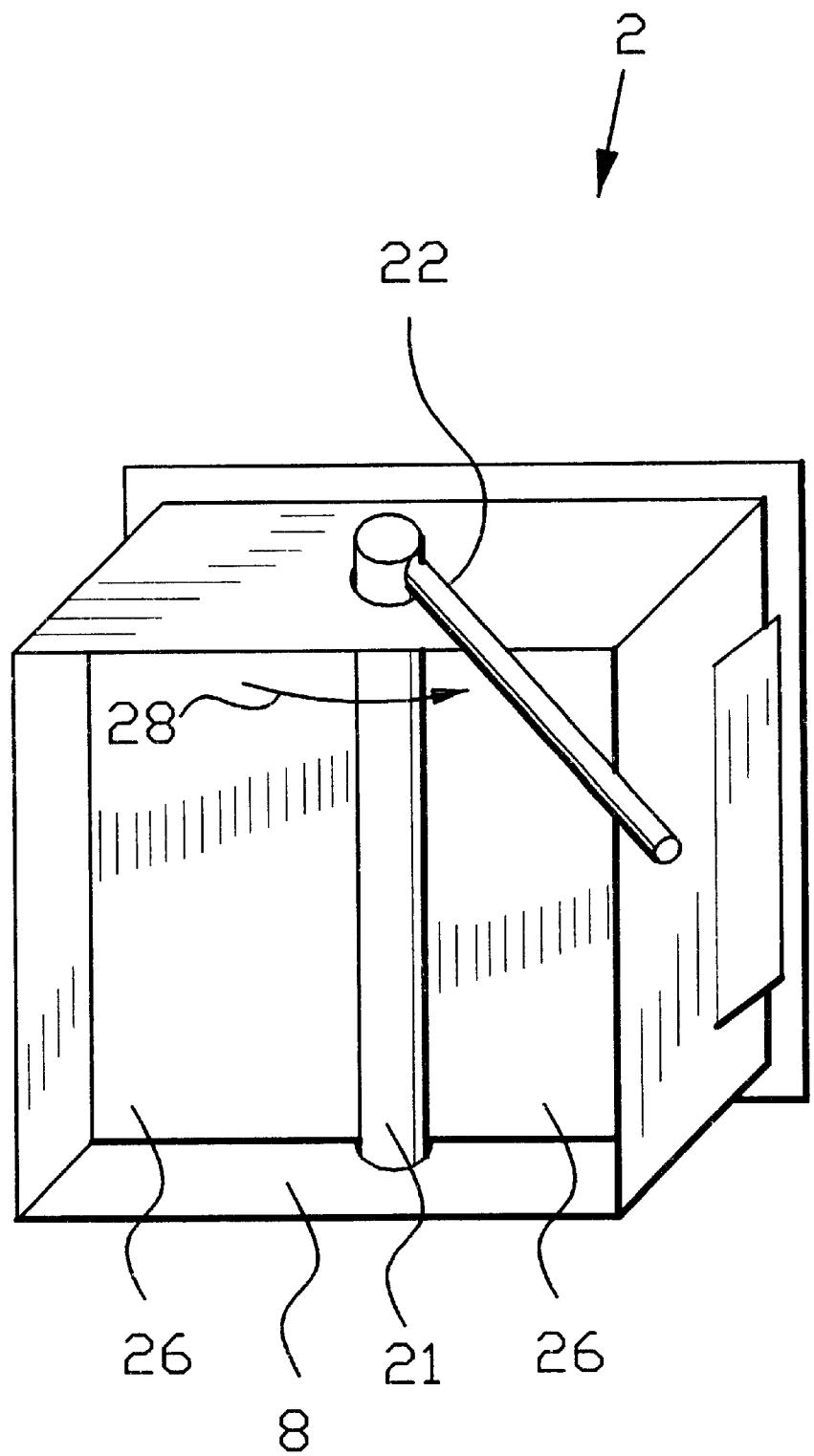
FIG. 2 is a rear quarter isometric view of a fairing vent in the closed position.
Figure 3:
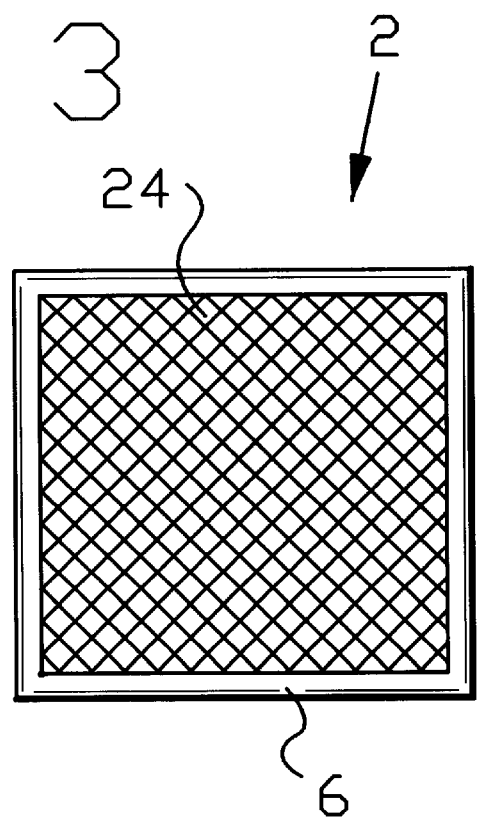
FIG. 3 is a front view of a fairing vent.

Referring now to FIGS. 1 and 2, fairing vent 2 comprises louver 18 rotatably attached to body 4, and louver handle 22 rigidly attached to louver 18. Body 4 comprises duct 8 defined by body roof 10, body walls 14, and body floor 12. Duct intake 7 is disposed at one end of duct 8, and duct outlet 9 is disposed at an opposite end of duct 8. Screen 24 covers duct intake 7 to prevent foreign bodies such as bugs and road debris from entering the vehicle cockpit via duct 8. Duct intake 7 faces forward, into the relative wind seen by the vehicle to which fairing vent 4 is mounted, and is disposed outside the vehicle fairing. Duct outlet 9 faces rearward into the cockpit of the vehicle, and air exiting fairing vent 2 through duct outlet 9 as indicated by arrows 5 in FIG. 1 serves to cool the vehicle occupants.

Body 4 further comprises lip 6 disposed around duct intake 7. Lip 6, in combination with at least one resilient tab 16 on body 4, serves to immobilize fairing vent 2 relative to vehicle fairing 36 as depicted in FIG. 5. As may be seen in FIG. 5, fairing 36 is sandwiched between at least one resilient tab 16 and lip 6. Although in FIGS. 1, 2 and 5 resilient tabs 16 are depicted attached to body 4 on body walls 14, it is contemplated to be within the scope of this disclosure that body tab(s) 16 may be attached on any appropriate surface of body 4.

Where fairing vent 2 is to be installed on fairing 36, fairing cutout 3S is cut into fairing 36. Fairing cutout 38 is sized to admit body 4, but not lip 6. Each resilient tab 16 is hingedly attached to body 4 at resilient tab hinge 17, and biased away from body 4 into an angle of approximately 10°±10° as indicated in FIG. 5. Resilient tabs 16 are thus free to rotate relative to body 4 as indicated by arrows 19 in FIG. 5, but will tend to return to an angle of approximately 10°±10° relative to body 4 as indicated in FIG. 5 due to their installed bias. This bias may be achieved by any number of existing methods. One such method would be forming body 4 and resilient tabs 16 from semi-flexible plastic, with a score to produce resilient tab spring 17. The material memory inherent in the semi-flexible plastic (or other appropriate material) serves to bias resilient tab(s) 16 into the position depicted in FIG. 5.

Once an appropriately sized fairing cutout 38 has been made, fairing vent 2 is installed on fairing 36 by sliding an extreme of body 4 opposite lip 6 into fairing 36 until lip 6 buts up against fairing 36. The distance between resilient tab(s) 16 and lip 6 is sized to admit the thickness of fairing 36. Resilient tab(s) 16 will slide through fairing cutout 38 against their bias away from body 4 until they are completely through fairing cutout 38. Once resilient tab(s) 16 are through fairing cutout 38, their installed bias away from body 4 will cause them to spring away from body 4 into an angle of approximately 10°±10° relative to body 4 as indicated in FIG. 5, thus trapping fairing 36 between lip 6 and resilient tab(s) 16, and thereby immobilizing fairing vent 2 relative to fairing 36.

Lover 18 comprises at least one louver fin 26 rigidly attached to louver axis 20. Louver handle 22 is rigidly attached to an extreme of louver axis 21, and is used to rotate louver 18 relative to body 4 in order to open and close fairing vent 2, as indicated by arrow 3 in FIG. 1.

Figure 4:
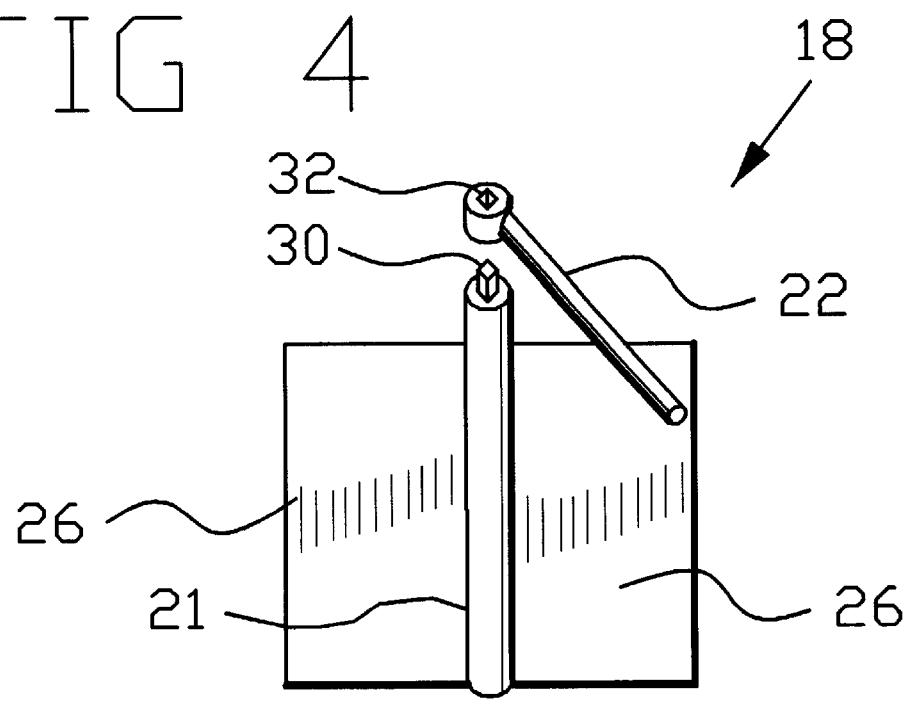
FIG. 4 is a rear quarter exploded isometric view of a louver and louver handle.

One method of rigidly attaching louver handle 22 to louver axis 21 is depicted in FIG. 4. Louver axis key 30 is disposed at one extreme of louver axis 21, and louver handle keyhole 32 sized to admit louver axis key 30 is disposed at one extreme of louver handle 22. Although a cross-sectional shape of louver axis key 30 and louver handle keyhole 32 is depicted as square in FIG. 4, any appropriate cross-sectional shape of louver axis key 30 and louver handle keyhole 32 is contemplated to be within the scope of this invention, so long as the cross-sectional shape of louver axis key 30 matches the cross-sectional shape of louver handle keyhole 32.

Body 4 comprises a pair of body bores 20 on opposing surfaces of body 4. Each body bore 20 is sized to rotatably admit an extreme of louver axis 21. Although FIGS. 1 and 2 depict body bores 20 in body floor 12 and body roof 10, it is contemplated to be within the scope of this invention for body bores 20 to be disposed in any appropriate pair of opposing surfaces of body 4.

During installation of fairing vent 2 in fairing 36, body 4 is first inserted into fairing cutout 38 as described above. Then louver 18 is inserted into duct 8 and the two extremes of louver axis 21 are snapped into corresponding body bores 20, and finally louver handle 22 is snapped onto an extreme of louver axis 21 having louver axis key 30. Fairing vent 2 is now installed on fairing 36, ready for use. In the alternative, the extreme of louver axis 21 having louver axis key 30 can be inserted into an appropriate body bore 20 first, and then the extreme of louver axis 21 opposite louver axis key 30 is snapped into the other body bore 20. In the preferred embodiment, body 4 was constructed of material having sufficient resiliency to allow slight deformation of body 4 in order to slide the extreme of louver axis 21 opposite louver axis key 30 into an appropriate body bore 20.

In the preferred embodiment, body 4, screen 24, louver 18 and louver handle 22 were made of plastic, nylon, synthetic, metal, or other appropriate material.

While a preferred embodiment of the invention has been illustrated herein, it is to be understood that changes and variations may be made by those skilled in the art without departing from the spirit of the appending claims.

DRAWING ITEM INDEX 2 fairing vent
3 arrow
4 body
5 arrow
6 lip
7 duct intake
8 duct
9 duct outlet
10 body roof
12 body floor
14 body wall
16 resilient tab
17 resilient tab hinge
18 louver
19 arrow
20 body bore
21 louver axis
22 louver handle
24 screen
26 louver fin
28 arrow
30 louver axis key
32 louver handle keyhole
36 fairing
38 fairing cutout

I claim:
1. A fairing vent comprising a louver rotatably attached to a body, and a louver handle attached to said louver, said body comprising a duct having a duct intake at one end and a duct outlet at an opposite end, said louver rotating within said duct, said louver being sized to block off said duct when said fairing vent is in a closed position, said body further comprising a lip around said duct intake and at least one resilient tab hingedly attached to said body, a distance between said at least one resilient tab and said lip being sized to admit a thickness of a fairing.

2. The fairing vent of claim 1 wherein said at least one resilient tab is biased away from said body.

3. The fairing vent of claim 2 wherein said at least one resilient tab is biased away from said body at an angle of 10°±10°.

4. The fairing vent of claim 1 wherein said body further comprises a screen across said duct intake, whereby foreign objects are prevented from entering said duct.

5. The fairing vent of claim 1 wherein said body comprises a pair of body bores on two opposing sides of said body, and wherein said louver comprises at least one louver fin attached to a louver axis, each said body bore being sized to rotatably admit an extreme of said louver axis, each extreme of said axis being rotatably disposed within one said body bore.

6. The fairing vent of claim 5 wherein said louver handle is attached to one extreme of said louver axis.

7. The fairing vent of claim 6 wherein said louver handle is attached to one extreme of said louver axis by means of a louver axis key disposed at one extreme of said louver axis and a louver handle keyhole disposed at one extreme of said louver handle, a cross-sectional shape of said louver axis key matching a cross-sectional shape of said louver handle keyhole.

8. A method of installing a fairing vent in a vehicle fairing, said fairing vent comprising a louver rotatably attached to a body, and a louver handle attached to said louver, said body comprising a duct having a duct intake at one end and a duct outlet at an opposite end, said louver rotating within said duct, said louver being sized to block off said duct when said fairing vent is in a closed position, said body further comprising a lip around said duct intake and at least one resilient tab hingedly attached to said body, said at least one resilient tab being installed at an angle biased away from said body, a distance between said at least one resilient tab and said lip being sized to admit a thickness of a fairing, said method of installing a fairing vent in a vehicle fairing comprising the steps of:

A. Cutting a fairing cutout into said fairing, said fairing cutout being sized to admit said body but not said lip;

B. Sliding an extreme of said body opposite said lip into said fairing cutout;

C. Permitting said fairing cutout to force said at least one resilient tab toward said body against its installed bias away from said body;

D. Further sliding said body into said fairing cutout until said lip buts against said fairing; and E. Permitting each said at least one resilient tab to spring away from said body as urged by said installed bias away from said body, thus sandwiching said fairing between said lip and said at least one resilient tab, thereby immobilizing said fairing vent relative to said fairing.

9. The method of installing a fairing vent in a vehicle fairing of claim 8 wherein said body further comprises a pair of body bores on two opposing sides of said body, and wherein said louver comprises at least one louver fin attached to a louver axis, each said body bore being sized to rotatably admit an extreme of said louver axis, said method of installing a fairing vent in a vehicle fairing comprising the further steps of:

F. Inserting said louver into said duct;

G. Snapping each said louver extreme into one said body bore; and

H. Attaching said louver handle to one extreme of said louver axis.

10. The method of installing a fairing vent in a vehicle fairing of claim 8 wherein said body further comprises a pair of body bores on two opposing sides of said body, and wherein said louver comprises at least one louver fin attached to a louver axis, each said body bore being sized to rotatably admit an extreme of said louver axis, one said louver axis extreme terminating in a louver axis key, said louver handle comprising a louver handle keyhole whose cross-sectional shape matches a cross-sectional shape of said louver axis key, said method of installing a fairing vent in a vehicle fairing comprising the further steps of:

F. Inserting said louver into said duct;

G. Inserting an extreme of said louver axis having said louver axis key into one said body bores;

H. Sliding an extreme of said louver axis opposite said louver axis key into an opposite said body bore; and I. Attaching said louver handle to said extreme of said louver axis having said louver axis key by snapping said louver handle keyhole onto said louver axis key.

11. A fairing vent comprising a body, a louver, and a louver handle attached to said louver, said body comprising a pair of body walls, a body roof, and a body floor, a duct defined by said body walls, body roof, and body floor, said duct having a duct intake and a duct outlet, a lip disposed around said duct intake, a resilient tab hingedly attached to at least one said body wall by means of a resilient tab hinge, a distance between the at least one resilient tab and said lip being sized to admit a vehicle fairing thickness, said louver being rotatably attached to said body within said duct, said louver being sized to block airflow through said duct when said fairing vent is in a closed position.

12. The fairing vent of claim 11 wherein said at least one resilient tab is biased away from said body.

13. He fairing vent of claim 12 wherein said at least one resilient tab is biased away from said body at an angle of 10°±10°.

14. The fairing vent of claim 11 wherein said body further comprises a screen across said duct intake, whereby foreign objects are prevented from entering said duct.

15. The fairing vent of claim 11 wherein said louver comprises at least one fin attached to a louver axis, and wherein said body further comprises a body bore disposed in said body floor and a body bore disposed in said body roof, each said body bore being sized to rotatably admit one extreme of said louver axis.

16. The fairing vent of claim 12 further comprising a louver axis key at one extreme of said louver axis and a louver handle keyhole sized to admit said louver axis key at one extreme of said louver handle, said louver axis key being disposed within said louver handle keyhole.

* * * * *